Patented Jan. 13, 1925.

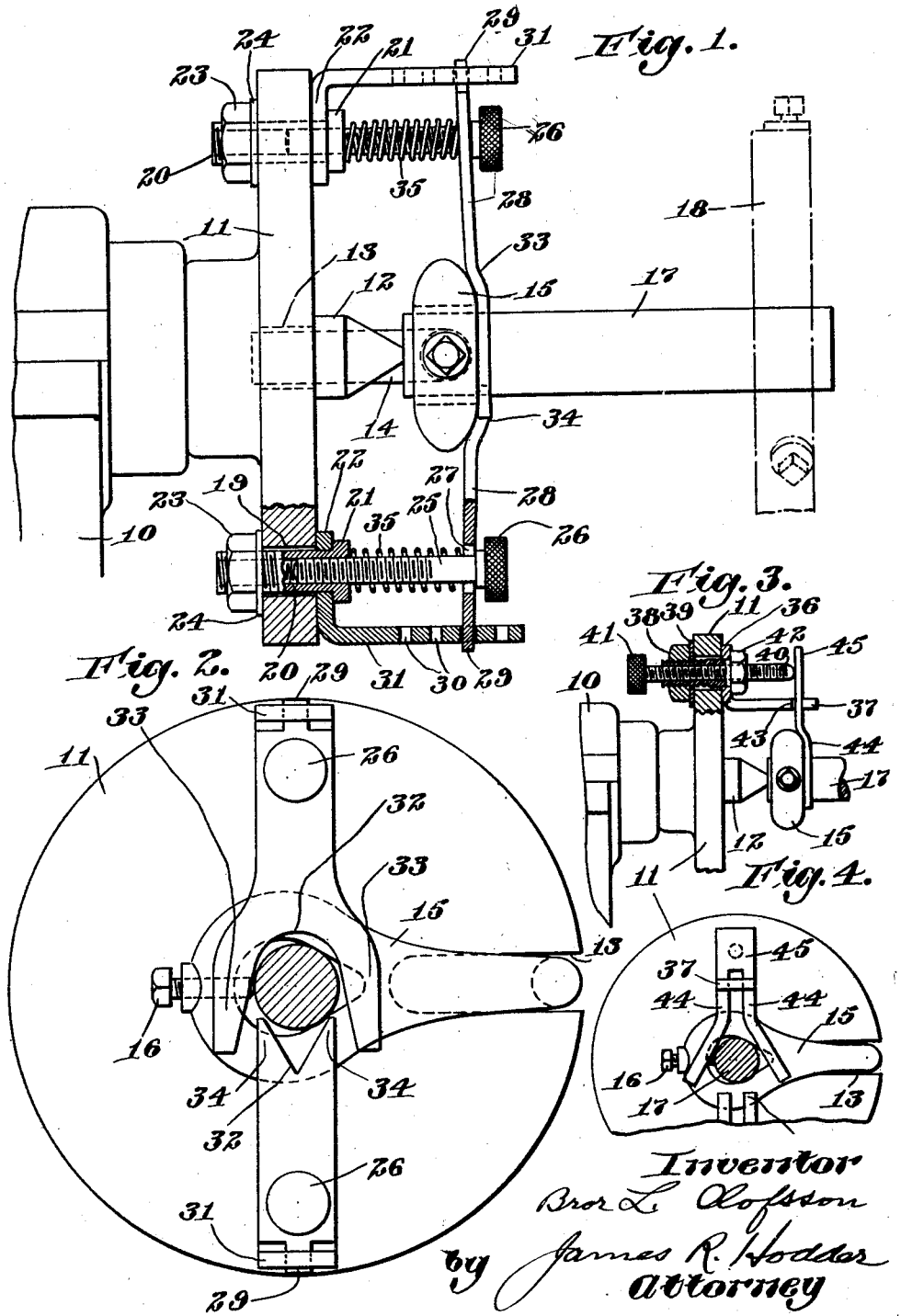

1,522,541

UNITED STATES PATENT OFFICE.

BROR L. OLOFSSON, OF BOSTON, MASSACHUSETTS.

HOLDBACK FOR LATHES.

Application filed April 6, 1923. Serial No. 630,357.

*To all whom it may concern:*

Be it known that I, BROR L. OLOFSSON, a citizen of the United States, and a resident of Boston, in the county of Suffolk and State of Massachusetts, have invented an Improvement in Holdbacks for Lathes, of which the following description, in connection with the accompanying drawings, is a specification, like letters on the drawings representing like parts.

My present invention relates to holdbacks, and more particularly to a hold-back for use in connection with a dog employed to hold work in a lathe, milling machine, or the like.

In lathe work, the ordinary lathe dog is secured to one end of a piece of work mounted on the live and dead centers in the lathe and has a projecting tail that engages with a slot or hole in the face plate of the lathe and by means of which the work is rotated on the centers to enable the necessary operations to be performed on the work, such as cutting, grinding, or the like. The ordinary lathe dog is amply sufficient in itself for carrying out such plain, ordinary operations. It frequently happens, however, that work is to be operated on in a lathe with the outer end unsupported from the dead center such, for example, where it is necessary to perform operations on the outer end of the piece of work. In such situations, a steady rest is employed to hold the outer end of the work in lieu of holding the same on the dead center and considerable difficulty has been experienced heretofore in devising means for holding the work against the live center. The ordinary manner of holding the work against the live center under these conditions is to strap the dog to the face plate as, at best, such a method is a makeshift, the strapping arrangement frequently breaks with consequent disastrous effects to the work and in many instances to the lathe itself. In an attempt to avoid the necessity of employing the various strapping arrangements for holding back the work onto the live center, complicated and cumbersome arrangements have been devised which cannot profitably be employed, particularly in the small shops, with the result that the old time strapping methods have been almost universally adhered to.

With a view to obviating the objections noted above, and to produce a holdback for use in holding back work against the live center in a lathe, and particularly with a view to rendering such device simple in structure and efficient in operation, I have designed the subject matter of the present invention which consists essentially of a simple bracket that may be radially attached to, and detached from a face plate of a lathe, and associated with such bracket I have arranged a clamping device which engages with the lathe dog attached to the inner end of the work and yieldingly holds such work by means of the lathe dog against the live center, producing in this manner a simple, efficient device.

The object of my invention, therefore, is an improved holdback for use in lathes and the like.

In the accompanying drawings illustrating preferred embodiments of my invention, Fig. 1 is a side elevation, partly in section, showing a plurality of my improved holdback devices secured to the face plate of a lathe and in position to hold back work against the live center of such lathe;

Fig. 2 is a front elevation of Fig. 1, the work being shown in section;

Fig. 3 is a fragmentary detail view of a modification of my invention associated with the face plate of a lathe, and Fig. 4 is a front elevation of Fig. 3.

Referring to the drawings, 10 designates the head-stock of a lathe, to the spindle of which is secured the usual face plate 11 and extending outwardly from the front end of the spindle is the usual live center 12. The face plate 11 is provided with a radial slot 13 in which loosely fits the tail 14 of the usual dog 15, which dog is provided with a setscrew 16 and whereby the dog is clamped to the work 17. Ordinarily the work 17 is supported at one end by the live center 12 and by the dead center in the tail stock (not shown) of the lathe and rotation of the spindle of the lathe causes a rotation of the face plate 11 and a consequent rotation of the work on the centers. When it is desired to perform operations on the extreme end of the work 17 that is ordinarily supported on the dead center, it becomes necessary to support the outer end of such work 17 by the usual steady rest 18 and in this event it becomes necessary to hold back the work 17 against the live center 12. To efficiently perform this holding back operation, I provide the face plate 11 with one or more holes 19 in which loosely fits an internally and externally threaded sleeve 20 provided on its outer end with a flange 21. An angular bracket having one of its arms 22 provided with a perforation through which passes the sleeve 20 is secured to the face plate 11 by means of the nut 23 that screws onto the outer threaded portion of the sleeve 20, a washer 24 being placed between the nut 23 and the face plate 11. Into the internal threads of the sleeve 20 is screwed a threaded bolt 25 provided on its outer end with a knurled head 26 and by means of which the bolt 25 is rotated. This bolt 25 passes through a slot 27 formed in a plate 28 and intermediate the ends thereof. One end of the plate 28 is provided with a reduced portion 29 that fits into one or the other of the rectangular perforations 30 formed in the other arm 31 of the angular bracket. The other end of the plate 28 is forked, as shown at 32, and the tines of the fork may be curved, as shown at 33, to fit the contour of the body of the dog 15 or may be bent, as shown at 34, and this latter construction enables the device to engage the lathe dog 15 at but a single point. Surrounding the bolt 25 and lying between the plate 28 and the outer face of the flange 21 is a spring 35 which tends to force the outer end of the plate 28 away from the lathe dog 15 and this construction enables me, when the bolt 25 is screwed into the threads of the sleeve 20, to hold the work 17 against the live center 12.

In using this form of my invention, the angular member comprised of the arms 22 and 31 is strapped to the face plate 11 in the manner shown and as above described, the reduced end 29 of the plate 28 is inserted in the appropriate perforation 30, the tines 33 or 34 of the plate 28 being brought into engagement with the lathe dog 15, as shown, and the bolt 25 rotated by means of the knurled head 26 until the desired degree of pressure is placed on the dog 15 and therefore on the work 17. Ordinarily but one of such devices is sufficient, though two or even more may be employed, if desirable or necessary, and I have, therefore, shown two of such devices diametrically arranged on the face plate 11.

Referring now to Figs. 3 and 4 wherein is shown a modification of my invention, I have provided an angular bracket comprised of arms 36 and 37 secured to the face plate 11 by an internally threaded bolt 42 that passes through a perforation in the arm 36 and in the face plate 11, the nut 38 engaging with the threads on the exterior of the bolt 42 clamping the arm 36 and face plate 11 together, a washer 39 being ordinarily provided between the nut 38 and the face plate 11. Through the threads on the interior of the bolt 42 is screwed a bolt 40 provided on its inner or left hand end with a knurled head 41 and by means of which the bolt 40 may be screwed into and out of (relatively speaking) the bolt 42. The arm 37 of the angular bracket member is provided with alined slots 43 into which fit legs 44 formed on one end of a plate 45, the extreme ends of the legs 44 being curved or pointed as were the tines of the fork ends 32 of the embodiment described with respect to Figs. 1 and 2. The body of the member 45 is adapted to be engaged by the end of the bolt 40 and it will be obvious that, with the device constructed and assembled on the face plate 11 as above described, and with the ends of the legs 44 engaging with the body of the dog 15, the arm 37 at the alined slots 43, taken in conjunction with the legs 44, act as a movable pivot about which the member 45 may be rotated by the end of the shaft 40 engaging with the body of the plate 45 and that this structure enables me to exert pressure to any desired degree on the dog 15 to hold back the work 17 against the live center 12.

While I have necessarily shown and described the preferred embodiments of my invention somewhat in detail, it is to be understood that I may vary the size, shape, and arrangement of parts comprising my invention within wide limits without departing from the spirit of the invention and my invention is of great utility in connection with all machines employing a steady rest and dog to turn the work, particularly lathes, grinders, milling machines, and the like.

Having thus described my invention, what I claim as new is:

1. In a device of the class described, the combination of an angular bracket, means for removably securing said bracket to the face plate of a lathe, a holdback plate pivotally secured to said bracket on an axis lying parallel to said face plate, and means for forcing the outer end of said holdback means toward the face plate.

2. In a holdback device for lathes and the like, the combination of an internally threaded sleeve, an angular bracket provided on one arm with a plurality of perforations, means including the internally threaded sleeve for securing the bracket to the face plate of a lathe, a holdback plate pivotally mounted in either of the perforations at will, a bolt threaded into the sleeve and engaging with the holdback plate, and a spring for normally holding the free end of the holdback plate away from the face plate.

3. In a device of the class described, the combination of an angular bracket, means for removably securing said bracket to the face plate of a machine, a holdback plate pivotally and removably mounted on said bracket on an axis lying parallel to said face plate, and means associated with said bracket and said holdback plate for holding work in operative relation to the face plate of the machine.

In testimony whereof, I have signed my name to this specification.

BROR L. OLOFSSON.